United States Patent
Zeile et al.

[15] 3,681,500

[45] Aug. 1, 1972

[54] SPRAY COMPOSITIONS FOR TREATMENT OF OBSTRUCTIVE DISORDERS OF THE RESPIRATORY TRACT AND METHODS THEREFOR

[72] Inventors: Karl Zeile; Werner Schulz; Rolf Banholzer; Helmut Wick, all of Ingelheim am Rhein, Germany

[73] Assignee: Boehringer Ingelheim GmbH, Ingelheim am Rhine, Germany

[22] Filed: Dec. 3, 1970

[21] Appl. No.: 94,951

[30] Foreign Application Priority Data

Dec. 12, 1969 Germany..............P 19 62 496.5

[52] U.S. Cl. ..................424/265, 424/319, 424/329, 424/330
[51] Int. Cl. .............................................A61k 27/00
[58] Field of Search......................................424/265

[56] References Cited

UNITED STATES PATENTS 3,505,337 4/1970 Zeile et al.....................260/292

FOREIGN PATENTS OR APPLICATIONS 708,644 12/1967 Belgium
24M 11/1960 France

*Primary Examiner*—Stanley J. Friedman
*Attorney*—Hammond & Littell

[57] ABSTRACT

Inhalation spray compositions for the treatment of obstructive disorders of the respiratory tract, comprising as an active ingredient a physiologically compatible quaternary salt of N-isopropyl-N-methyl-nortropine tropic acid ester, optionally in combination with a mucolytic and/or a bronchospasmolytic.

14 Claims, No Drawings

SPRAY COMPOSITIONS FOR TREATMENT OF OBSTRUCTIVE DISORDERS OF THE RESPIRATORY TRACT AND METHODS THEREFOR

This invention relates to inhalation spray compositions for the treatment of obstructive disorders of the respiratory tract, comprising as an active ingredient a physiologically acceptable quaternary salt of N-isopropyl-N-methyl-nortropine tropic acid ester.

THE PRIOR ART

Quaternary salts of N-isopropyl-N-methyl-nortropine tropic acid ester, their preparation and their use as secretolytics and spasmolytics by the oral, rectal and injection route of administration are described in U.S. Pat. No. 3,505,337, issued Apr. 7, 1970.

THE INVENTION

We have discovered that physiologically acceptable quaternary salts of N-isopropyl-N-methyl-nortropine tropic acid ester, and especially N-isopropyl-noratropinium methobromide, are very effective in reducing the air flow resistance in the respiratory tract when administered per inhalationem, and are therefore useful for the treatment of obstructive disorders of the respiratory tract, such as asthma, in warm-blooded animals including humans.

Thus, the present invention relates to nebulizable inhalation spray compositions consisting essentially of an inert, pharmaceutically acceptable liquid carrier and, as the active ingredient, from 0.001 to 3.0 percent, preferably 0.005 to 1.5 percent, based on the total weight of the composition, of a pharmaceutically acceptable quaternary salt of N-isopropyl-N-nortropine tropic acid ester and optionally also an effective amount of a mucolytic and/or of a broncho-spasmolytic; as well as to the method of treating obstructive disorders of the respiratory tract in warm-blooded animals and humans by administering said compositions *per inhalationem*.

Examples of pharmaceutically acceptable quaternary salts of N-isopropyl-N-methyl-nortropine tropic acid ester are those whose anion is the anion of hydrobromic, nitric or methanesulfonic acid; however, particularly preferred is N-isopropyl-N-methyl-noratropinium methobromide.

Examples of mucolytic agents suitable for optional incorporation into the inhalation spray compositions according to the present invention are the known cysteine derivatives N-acetyl-L-(+)-cysteine and cysteine-N-acetic acid hydrochloride.

Examples of bronchial antispasmodic agents suitable for optional incorporation into the inhalation spray compositions of the present invention are 1-(3',5'-dihydroxy-phenyl)-1-hydroxy-2-[1''-(p-hydroxy-phenyl)-isopropyl-amino]-ethane hydrobromide and N-cyclohexyl-N-methyl-2-(2-amino-3,5-dibromo)-benzylammonium chloride.

The inhalation spray compositions pursuant to the present invention are prepared by dissolving the active ingredient or ingredients in a suitable pharmaceutically acceptable inert, nebulizable liquid, preferably water; the resulting solution is then filled into a conventional atomizing device, such as an inhaler, provided with a metering spray valve. Another way of preparing the inhalation spray compositions is to dissolve or suspend the active ingredient or ingredients, if necessary with the aid of a suitable conventional solution promoter or auxiliary suspension agent, in a conventional, pharmaceutically acceptable propellant gas which has been liquefied by compression or deep cooling, and filling the resulting composition into a conventional aerosol container provided with a metering aerosol spray valve.

In either case, the inhalation spray produced thereby is an effective composition for the treatment of obstructive disorders of the respiratory tract *per inhalationem*. In comparison to atropine, only one-fortieth of the amount of the active ingredient according to the present invention is required to achieve the same effect as with atropine, and the compositions of the instant invention have the further advantage that they do not produce the undesirable side effects commonly observed with inhalation sprays comprising atropine as an active ingredient.

The effectiveness of N-isopropyl-noratropinium methobromide as an agent for reducing the air flow resistance caused by obstructive disorders, such as asthma, was ascertained in a series of clinical tests on adult patients. The afflicted test subjects were made to inhale for one minute a mist produced by nebulizing an aqueous 0.025 percent and 0.0125 percent solution, respectively, of N-isopropyl-noratropinium methobromide with the aid of a conventional inhaler having an air through-put rate of 6.5 liters/minute. The air flow resistance in the respiratory tract was measured just before commencement of the inhalation and then 5, 30, 60, 120 and 180 minutes after the inhalation. The following results were obtained:

TABLE

| Concentration of N-Isopropyl-nor-atropinium metho-bromide solution | No. of Test Sub-jects | Average value of air flow resistance in cm $H_2O$/liter/sec after | | | | | |
|---|---|---|---|---|---|---|---|
| | | 0 | 5 | 30 | 60 | 120 | 180 min. |
| 0.5 mgm/2 ml = 0.025% | 12 | 8.5 | 5.1 | 4.4 | 4.5 | 5.6 | 4.3 |
| 0.25 mgm/2ml = 0.0125% | 13 | 11.8 | 6.3 | 5.2 | 5.0 | 5.5 | 6.0 |

The following examples illustrate a few inhalation spray compositions pursuant to the present invention, and will enable others skilled in the art to understand the invention more completely. The percentages are percent by weight.

EXAMPLE 1

Aerosol

The spray composition was compounded from the following ingredients:

| | |
|---|---|
| N-Isopropyl-noratropinium methobromide | 0.007 – 1.43% |
| Sorbitan trioleate (surfactant) | 0.500 – 2.00% |
| Propellant mixture consisting of monofluorotrichloromethane and difluorodichloromethane (40 : 60) | q.s.ad 100% |

Preparation

The noratropinium compound and the surfactant were suspended in the propellant mixture which had previously been liquefied by compression or deep cooling, and the suspension was filled into an aerosol container provided with a metering valve which dispensed an aerosol containing from 5 to 1,000 of the noratropinium compound with each actuation of the valve. When the amount of aerosol thus expelled was inhaled by an adult person afflicted with an obstructive disorder of the respiratory tract, such as asthma, the air flow resistance in the respiratory tract was markedly decreased and free breathing restored after a few minutes.

EXAMPLE 2

Aerosol With Combination of Bronchospasmolytics

The spray composition was compounded from the following ingredients:

| | |
|---|---|
| N-Isopropyl-noratropinium methobromide | 0.007 – 1.43% |
| 1-(3′, 5′-Dihydroxy-phenyl)-1-hydroxy-2-[1′′-(p-hydroxy-phenyl)-isopropyl-amino]-ethane hydrobromide (bronchospasmolytic) | 0.0715 – 0.286% |
| Sorbitan trioleate (surfactant) | 0.05 – 2% |
| Propellant mixture consisting of monofluorotrichloromethane and difluorodichloromethane (40 : 60) | q.s.ad 100% |

Preparation

The active ingredients and the surfactant were suspended in the propellant mixture which had previously been liquefied by compression or deep cooling, and the suspension was filled into an aerosol container provided with a metering valve which dispensed an aerosol containing from 5 to 1,000 γ of the noratropinium compound and from 50 – 200γ of the bronchospasmolytic with each actuation of the valve. When the amount of aerosol thus expelled was inhaled by an adult person afflicted with an obstructive disorder of the respiratory tract, such as asthma, the air flow resistance in the respiratory tract was markedly decreased and free breathing restored after a few minutes.

EXAMPLE 3

Inhalation Spray With Bronchospasmolytic

The spray composition was compounded from the following ingredients:

| | |
|---|---|
| N-Isopropyl-noratropinium methobromide | 0.007 – 1.0% |
| Aqueous solution of N-cyclohexyl-N-methyl-2-(2-amino-3,5-dibromo)benzylammonium chloride (2 mgm/ml) | q.s.ad 100% |

Preparation

The noratropinium compound was dissolved in the solution of the benzylammonium compound, and the resulting solution was filled into a conventional atomizing inhaler provided with a spray valve and an actuator piston which expelled a spray containing from 50 to 1,000γ of the noratropinium compound with each stroke of the piston. When the spray thus expelled was inhaled by an adult person afflicted with an obstructive disorder of the respiratory tract, such as asthma, the air flow resistance in the respiratory tract was markedly decreased and free breathing restored after a few minutes, and an effective brochospasmolytic action was produced.

EXAMPLE 4

Inhalation Spray with Mucolytic

The same results as in Example 3 were obtained with an inhalation spray compounded in like manner from the following ingredients:

| | |
|---|---|
| N-Isopropyl-noratropinium methobromide | 0.007 – 1.0% |
| Aqueous solution of N-acetyl-L(+)-cysteine or cysteine-N-acetic acid hydrochloride (0.2 gm/ml) | q.s.ad 100% |

EXAMPLE 5

Inhalation Spray

The spray composition was compounded from the following ingredients:

| | |
|---|---|
| N-Isopropyl-noratropinium methobromide | 0.005 – 0.4% |
| Phosphate buffer solution pH5 (aqueous) | q.s.ad 100% |

Preparation

The noratropinium compound was dissolved in the aqueous buffer solution, and the resulting solution was filled into a conventional atomizing inhaler provided with a spray valve and an actuator piston which expelled a spray containing from 5 to 1,000γ of the noratropinium compound with each stroke of the piston. When the spray thus expelled was inhaled by an adult person afflicted with an obstructive disorder of the respiratory tract, such as asthma, the air flow resistance in the respiratory tract was markedly decreased and free breathing restored after a few minutes.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. The method of reducing the air flow resistance in the respiratory tract of a human patent afflicted with an asthmatic disorder of the respiratory tract, which comprises administering to said patient per inhalationem from 5 to 1,000 γ of a pharmaceutically acceptable quaternary atropinium salt of the formula $$\left[ \begin{array}{c} H_2C\text{———}CH\text{———}CH_2 \\ \phantom{H_2C}|\phantom{\text{———}}CH_3\phantom{\text{———}}|\phantom{\text{———}}|\phantom{\text{———————}}CH_2OH \\ \phantom{H_2C————}HC\text{——}N^{\oplus}\text{—}CH_3\phantom{|}CH\text{—}OOC\text{—}CH \\ \phantom{H_2C————}|\phantom{——}CH_3\phantom{————}|\phantom{————}C_6H_5 \\ H_2C\text{———}CH\text{———}CH_2 \end{array} \right] \cdot X^{\ominus}$$

wherein X is the anion of an acid.

2. The method according to claim 8, where X is the anion of hydrobromic, nitric or methanesulfonic acid.

3. The method according to claim 8, where X is the anion of hydrobromic acid.

4. The method according to claim 8, which comprises simultaneously administering to said patient per inhalationem and effective bronchospasmolytic amount of a bronchial antispasmodic selected from the group consisting of 1-(3′,5′-dihydroxy-phenyl)-1-hydroxy-2-[1″-(p-hydroxy-phenyl)-isopropyl-amino]-ethane hydrobromide and N-cyclohexyl-N-methyl-2-(2-amino-3,5-dibromo)-benzylammonium chloride.

5. The method according to claim 8, which comprises simultaneously administering to said patient per inhalationem an effective mucolytic amount of a compound selected from the group consisting of N-acetyl-L(+)-cysteine and cysteine-N-acetic acid hydrochloride.

6. A pharmaceutical inhalation spray composition for treating asthmatic disorders of the respiratory tract, consisting of 0.007 to 1.0 percent weight, based on the total weight of said composition, of a pharmaceutically acceptable quaternary atropinium salt of the formula

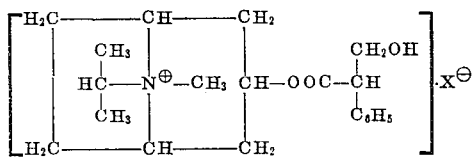

wherein X is the anion of an acid, and the balance an aqueous solution of 2 mgm/ml of N-cyclohexyl-N-methyl-2-(2-amino-3,5-dibromo)-benzylammonium chloride.

7. A composition according to claim 6, wherein said atropinium salt is N-isopropyl-noratropinium methobromide.

8. A pharmaceutical inhalation spray composition for treating asthmatic disorders of the respiratory tract, consisting of 0.007 to 1.0 percent weight, based on the total weight of said composition, of a pharmaceutically acceptable quaternary atropinium salt of the formula

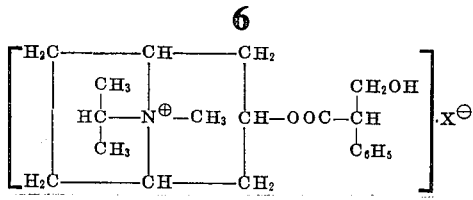

wherein X is the anion of an acid, and the balance an aqueous solution of 0.2 mgm/ml of a mucolytic selected from the group consisting of N-acetyl-L(+)-cysteine and cysteine-N-acetic acid hydrochloride.

9. A composition according to claim 8, wherein said atropinium salt is N-isopropyl-noratorpinium methobromide.

10. A pharmaceutical inhalation spray composition for treating asthmatic disorders of the respiratory tract, consisting essentially of an effective amount of a pharmaceutically acceptable quaternary atropinium salt of the formula

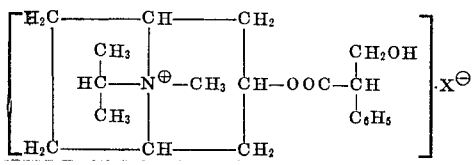

wherein X is the anion of an acid, and a non-aqueous liquid carrier.

11. A composition according to claim 10, wherein said non-aqueous liquid carrier is a liquified mixture of monofluoro-trichloro-methane and difluoro-dichloromethane.

12. A composition according to claim 10, wherein said atropinium salt is N-isopropyl-noratropinium methobromide.

13. A composition according to claim 10, which additionally comprises up to 2 percent by weight of sorbitan tri-oleate. -dihydroxy-phenyl)-

14. A composition according to claim 13, which additionally comprises an effective bronchospasmolytic amount of 1-(3′,5′-dhydroxy-phenyl)-1-hydroxy-2-[1″-(p-hydroxy-phenyl)-isopropyl-amino]-ethan hydrobromide.

* * * * *

UNITED STATES PATENT OFFICE
CERTIFICATE OF CORRECTION

Patent No. 3,681,500   Dated August 1, 1972

Inventor(s) KARL ZEILE, WERNER SCHULZ, ROLF BANHOLZER and HELMUT WICK

It is certified that error appears in the above-identified patent and that said Letters Patent are hereby corrected as shown below:

Col. 3, line 6: insert -- $\gamma$ -- after "1,000".

Cols. 4 and 5: Claims 2, 3, 4 and 5, line 1 of each, change "claim 8" to --claim 1--.

Col. 5, line 39: insert --by-- before "weight".

Col. 6, line 40: correct the spelling of "dihydroxy";

" 6, line 41: correct the spelling of "ethane";

" 6, line 37: delete "-dihydroxy-phenyl)-".

Signed and sealed this 15th day of May 1973.

(SEAL)
Attest:

EDWARD M. FLETCHER, JR.
Attesting Officer

ROBERT GOTTSCHALK
Commissioner of Patents

UNITED STATES PATENT AND TRADEMARK OFFICE

CERTIFICATE EXTENDING PATENT TERM
UNDER 35 U.S.C. 156

Patent No.   : 3,681,500

Dated        : August 1, 1972

Inventor(s)  : Karl Zeile, et al

Patent Owner : Boehringer Ingelheim International GmbH

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

2 YEARS with all rights pertaining thereto as provided by 35 USC 156(b).

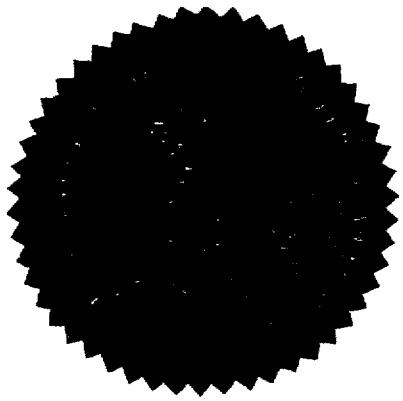

I have caused the seal of the Patent and Trademark Office to be affixed this Twenty-second day of March 1988.

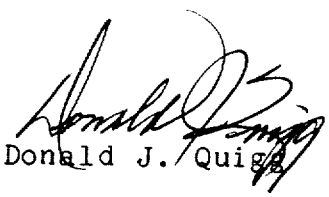

Donald J. Quigg

Assistant Secretary and Commissioner of Patents and Trademarks